US012112727B2

(12) United States Patent
Yamada

(10) Patent No.: US 12,112,727 B2
(45) Date of Patent: Oct. 8, 2024

(54) STRINGED MUSICAL INSTRUMENT STRING AND METHOD FOR MANUFACTURING STRINGED MUSICAL INSTRUMENT STRING

(71) Applicant: YAMADA ATOMIZER CO., LTD., Tokyo (JP)

(72) Inventor: Masaaki Yamada, Tokyo (JP)

(73) Assignee: YAMADA ATOMIZER CO., LTD., Tokyo (JP)

( * ) Notice: Subject to any disclaimer, the term of this patent is extended or adjusted under 35 U.S.C. 154(b) by 0 days.

(21) Appl. No.: 18/562,778

(22) PCT Filed: Apr. 21, 2022

(86) PCT No.: PCT/JP2022/018387
§ 371 (c)(1),
(2) Date: Nov. 20, 2023

(87) PCT Pub. No.: WO2023/276422
PCT Pub. Date: Jan. 5, 2023

(65) Prior Publication Data
US 2024/0265892 A1 Aug. 8, 2024

(30) Foreign Application Priority Data
Jun. 30, 2021 (JP) ................................ 2021-109182

(51) Int. Cl.
*G10D 3/10* (2006.01)

(52) U.S. Cl.
CPC ...................................... *G10D 3/10* (2013.01)

(58) Field of Classification Search
CPC ........................................................ G10D 3/10
See application file for complete search history.

(56) References Cited

U.S. PATENT DOCUMENTS 2,728,278 A * 12/1955 Dvorak .................... G10D 3/10 84/199
4,339,499 A * 7/1982 Tappe ...................... G10D 3/10 428/394
5,583,190 A 12/1996 Brinati et al.

FOREIGN PATENT DOCUMENTS

CN 104347052 A 2/2015
DE 512676 * 11/1927 ............... G10D 3/10
(Continued)

OTHER PUBLICATIONS

JPO, Japanese Office Action mailed on Aug. 24, 2021 for Japanese patent application No. 2021-109182 with English translation, total 8 pages.

(Continued)

*Primary Examiner* — Robert W Horn
(74) *Attorney, Agent, or Firm* — MASUVALLEY & PARTNERS; Peter Martinez

(57) ABSTRACT

A stringed musical instrument string 1 of the present invention has a configuration in which a wire rod W including a synthetic resin as a constituent material is wound in a coil shape at a normal time, and is stretched over a target stringed musical instrument in a state of being unwound from the coil shape when used. With such a configuration, the stringed musical instrument string 1 can reproduce an excellent timbre close to the timbre of a natural gut string at low cost by the wire rod W including a synthetic resin as a constituent material and has various characteristics (for example, no negative aspect even when the tension is weak, high volume, stable string even immediately after stretched, and accurate pitch) as the stringed musical instrument string 1.

8 Claims, 2 Drawing Sheets

(56) References Cited

FOREIGN PATENT DOCUMENTS

| | | | |
|---|---|---|---|
| JP | S61-026088 | A | 2/1986 |
| JP | H07-002937 | A | 1/1995 |
| JP | H07-150434 | A | 6/1995 |
| JP | 2014-145812 | A | 8/2014 |
| JP | 6983448 | B1 | 12/2021 |

OTHER PUBLICATIONS

JPO as International Search Authorization, International written opinion for PCT/JP2022/018387 mailed on Jul. 19, 2022 with English Translation, total 5 pages.

JPO as International Search Authorization, International Search Report for PCT/JP2022/018387 mailed on Jul. 19, 2022 with English Translation, total 12 pages.

JPO, Japanese Decision to Grant mailed on Oct. 19, 2021 for Japanese patent application No. 2012-109182 with English Translation, total 5 pages.

CNIPA, Chinese Office Action issued on Feb. 24, 2024 for Chinese patent application No. 1 English translation, total 20 pages.

CNIPA, Second Office Action dated Jul. 27, 2024 for Chinese Patent Application No. 202280024368.4 with English translation, total 13 pages.

* cited by examiner

STRINGED MUSICAL INSTRUMENT STRING AND METHOD FOR MANUFACTURING STRINGED MUSICAL INSTRUMENT STRING

RELATED APPLICATIONS

This application is the U.S. National Phase of and claims priority to International Patent Application No. PCT/JP2022/018387, International Filing Date Apr. 21, 2022; which claims benefit of Japanese Patent Application No. 2021-109182 filed Jun. 30, 2021; both of which are incorporated herein by reference in their entireties.

TECHNICAL FIELD

The present invention relates to a stringed musical instrument string and a method for manufacturing a stringed musical instrument string. More specifically, the present invention relates to a stringed musical instrument string and a method for manufacturing the stringed musical instrument string capable of providing a stringed musical instrument string excellent in timbre at low cost.

BACKGROUND ART

As a string (a stringed musical instrument string) used for a musical instrument typified by a ukulele and a guitar such as a gut guitar, for example, a string made of a wire rod containing a synthetic resin such as a polyvinylidene fluoride-based resin or a polyamide (also called nylon (registered trademark))-based resin is known and widely sold. In addition, a technique related to a musical instrument string including a monofilament of vinylidene fluoride has been proposed (e.g., refer to Patent Literature 1).

CITATION LIST

Patent Literature

Patent Literature 1: JP 7-2937 A ([Claims], [0011])

SUMMARY OF INVENTION

Technical Problem

However, the stringed musical instrument string such as a conventional string for a ukulele or string for a guitar is not sufficient in terms of timbre, and the actual situation is that an expensive string has to be used when a good timbre is desired.

The present invention has been made in view of the above problem, and an object of the present invention is to provide a stringed musical instrument string and a method for manufacturing a stringed musical instrument string capable of providing a stringed musical instrument string that is suitable for a stringed musical instrument such as a ukulele or a guitar and can reproduce a timbre close to the timbre of a natural gut string at low cost.

Solution to Problem

In order to solve the above problem, a stringed musical instrument string according to the present invention includes a wire rod containing a synthetic resin and having an outer diameter d of 0.3 to 1.2 mm, and the stringed musical instrument string has a shape wound in a coil shape.

In the stringed musical instrument string according to the present invention, in the above present invention, the synthetic resin is at least one selected from the group consisting of a polyvinylidene fluoride-based resin and a polyamide-based resin.

In the stringed musical instrument string according to the present invention, in the above present invention, the shape wound in a coil shape has a winding diameter D of 0.8 to 4.0 mm, and the number of turns (the number of coils) t per 1 m that is 130 to 520 times/m.

In the stringed musical instrument string according to the present invention, in the above present invention, the stringed musical instrument string is a string for a ukulele or a string for a guitar.

A method for manufacturing a stringed musical instrument string according to the present invention includes

- fixing one end of a wire rod containing a synthetic resin and having an outer diameter d of 0.3 to 1.2 mm, and twisting another end of the wire rod with respect to a length direction to form a shape of the wire rod wound in a coil shape.

In the method for manufacturing a stringed musical instrument string according to the present invention, in the above present invention, the synthetic resin is at least one selected from the group consisting of a polyvinylidene fluoride-based resin and a polyamide-based resin.

In the method for manufacturing a stringed musical instrument string according to the present invention, in the above present invention, the wire rod is formed into a shape wound in a coil shape at a number of rotations of 600 rotations/m or more.

In the method for manufacturing a stringed musical instrument string according to the present invention, in the above present invention, the wire rod having a shape wound in a coil shape is irradiated with a γ ray.

Advantageous Effects of Invention

The stringed musical instrument string according to the present invention has a configuration in which a wire rod including a synthetic resin as a constituent material is wound in a coil shape at a normal time, and is stretched over a target stringed musical instrument in a state of being unwound from the coil shape when used. With such a configuration, an excellent timbre close to the timbre of a natural gut string can be reproduced at low cost by a wire rod including a synthetic resin as a constituent material, and a stringed musical instrument string having various characteristics as a stringed musical instrument string is obtained.

In addition, the method for manufacturing a stringed musical instrument string according to the present invention makes it possible to manufacture a stringed musical instrument string having the above-described effect, which is wound in a coil shape at a normal time, by a simple method.

DESCRIPTION OF EMBODIMENTS

(I) Configuration of Stringed Musical Instrument String 1 According to Present Invention Hereinafter, one aspect of a stringed musical instrument string 1 according to the present invention will be described with reference to the drawings.

Figure 1:
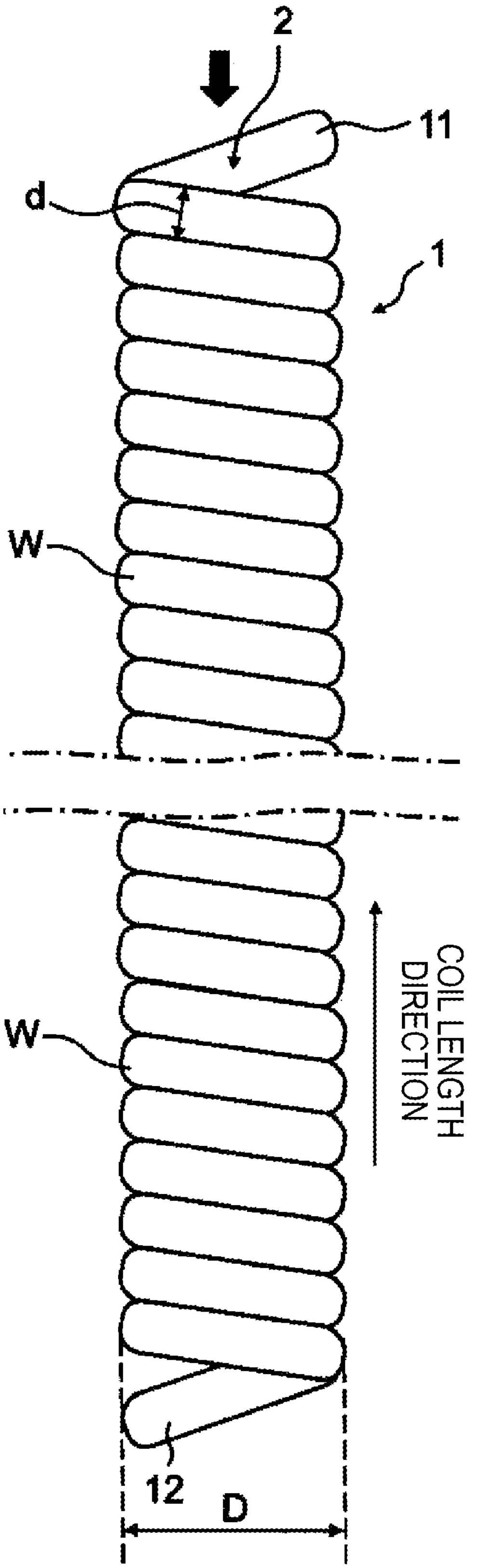
FIG. 1 is a perspective view illustrating one aspect of a stringed musical instrument string according to the present invention.
Figure 2:
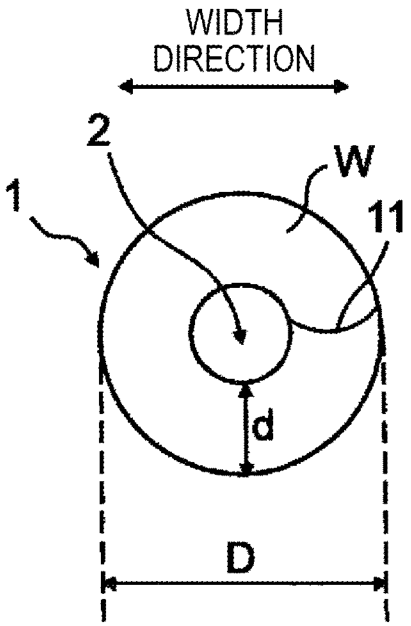
FIG. 2 is a top view of FIG. 1.

FIG. 1 is a perspective view illustrating one aspect of the stringed musical instrument string 1 according to the present invention, and FIG. 2 is a view of FIG. 1 as viewed in an upward direction (a direction of the black bold arrow in FIG. 1). FIGS. 1 and 2 indicate the stringed musical instrument string 1, a first end 11, a second end 12, an internal space 2, a wire rod W (to be the stringed musical instrument string 1), an outer diameter d of the stringed musical instrument string 1, and a winding diameter D. In FIG. 1, a part (middle part) of the whole is omitted by two broken lines.

The stringed musical instrument string 1 (hereinafter, may be simply referred to as "string 1") illustrated in FIGS. 1 and 2 has a shape wound in a coil shape at a normal time (indicates a state of not being used. The same applies hereinafter), and is unwound from the coil shape and stretched over a target stringed musical instrument when used.

The stringed musical instrument string 1 (hereinafter, may be simply referred to as a "string") according to the present invention can be used for, for example, various stringed musical instruments such as a ukulele, a guitar (for example, a gut guitar or the like to which a fluorocarbon string, a nylon string, or the like has been applied), a mandolin, a banjo, a Japanese harp, a Taisho lyre, and a shamisen.

The stringed musical instrument string 1 according to the present invention includes the wire rod W (processing to be the stringed musical instrument string 1 will be described later. See also FIG. 3) containing a synthetic resin (using a synthetic resin as a constituent material), and for example, a synthetic resin such as a fluororesin such as a polyvinylidene fluoride (PVDF)-based resin or a polytetrafluoroethylene (PTFE)-based resin, a polyamide (nylon (registered trademark. Others are the same for "nylon"))-based resin, an acetate-based resin such as an acetylcellulose-based resin, or a polyolefin-based resin such as a polyethylene-based resin, a polypropylene-based resin, or a polyethylene terephthalate-based resin is preferably used as a constituent material of the stringed musical instrument string 1 or the wire rod W forming the stringed musical instrument string 1. In the present invention, it is particularly preferable to use a polyvinylidene fluoride-based resin or a polyamide-based resin that has been widely used as a constituent material of the stringed musical instrument string 1. The above-mentioned synthetic resins may be used alone, or may be used in combination of two or more thereof.

When the material constituting the wire rod W forming the stringed musical instrument string 1 is a polyvinylidene fluoride-based resin or a polyamide-based resin, it is possible to expect effects such as an excellent timbre and sound quality and more stable sound production when used as the stringed musical instrument string 1. A polyvinylidene fluoride-based resin is used as a raw material of a fishing line (also for a stringed musical instrument string) for a string called "fluorocarbon (line)". In the present invention, the wire rod W forming the stringed musical instrument string 1, such fluorocarbon (line) or a thread (nylon thread) containing a polyamide (nylon) resin can be used.

As the polyvinylidene fluoride-based resin, a homopolymer of a vinylidene fluoride monomer is preferably used. In addition, the polyvinylidene fluoride-based resin is not limited to such a homopolymer, and as another polyvinylidene fluoride-based resin, a copolymer of one or two or more of a vinylidene fluoride monomer and a monomer copolymerizable therewith, a mixture of this copolymer and a homopolymer of a vinylidene fluoride monomer, or the like can be used.

Examples of the monomer copolymerizable with the vinylidene fluoride monomer include ethylene trifluoride, ethylene tetrafluoride, ethylene trifluoride chloride, propylene hexafluoride, and vinyl fluoride, and one type thereof may be used alone, or two or more types thereof may be used in combination.

The polyvinylidene fluoride-based resin may contain additives such as various organic pigments, a polyester-based plasticizer, a phthalic acid ester-based plasticizer, a nucleating agent represented by flavanthrone, a composition formed by mixing a resin material having good compatibility with a vinylidene fluoride-based resin such as a poly (meth) acrylic acid ester, a polyester, and a methyl acrylate-isobutylene copolymer, and the like as long as the object and effect of the present invention are not hindered. In addition, various additives (plasticizers, antioxidants, lubricants, and the like.) to be applied at the time of molding the wire rod W can be appropriately added to the synthetic resin to be used including the polyvinylidene fluoride-based resin as long as the object and effect of the present invention are not hindered.

The content of the polyvinylidene fluoride-based resin in the composition is preferably 90 mass % or more, and particularly preferably 95 mass % or more. As the plasticizer, for example, it is preferable to use a polyester in which the composition of the repeating unit is formed of an ester of a dialcohol having 2 to 4 carbon atoms and a dicarboxylic acid having 4 to 6 carbon atoms, the terminal group is formed of a monovalent acid group having 1 to 3 carbon atoms or a monovalent alcohol residue, and the molecular weight is 1500 to 4000.

The outer diameter d (in common with the outer diameter of the wire rod W forming the stringed musical instrument string 1. The same applies hereinafter) of the stringed musical instrument string 1 according to the present invention as illustrated in FIGS. 1 and 2 can be appropriately determined depending on the constituent material of the wire rod W forming the stringed musical instrument string 1, the musical instrument (ukulele, guitar, and the like) to be applied, the scale of the string to be applied in the musical instrument (which scale of the first to the fourth strings is used in the case of a ukulele? In the case of a guitar (a gut guitar and the like), which scale of the first to the third strings, to which the stringed musical instrument string 1 of the present invention can be applied to, for example, is used? The same applies hereinafter for the scale of the string to be applied), and the like. In general, the outer diameter d may be 0.3 to 1.2 mm, preferably 0.4 to 1.0 mm, and particularly preferably 0.45 to 0.9 mm.

In the present invention, in a case where the stringed musical instrument string 1 is a string for a ukulele, the outer diameter d of the stringed musical instrument string 1 (the wire rod W) is preferably approximately 0.4 to 1.0 mm, and particularly preferably 0.45 to 0.9 mm in order to be applied to strings from the first string to the fourth string (first string (A), second string (E), third string (C), fourth string (G) (open scale in the parentheses). In a case where the stringed musical instrument string 1 is a string for a guitar, the outer diameter d of the stringed musical instrument string 1 (the wire rod W) is preferably approximately 0.4 to 1.0 mm, and particularly preferably 0.45 to 0.9 mm in order to be applied to strings from the first string to the third string (first string (E), second string (B), third string (G), fourth string (D) (open scale in the parentheses).

As illustrated in FIGS. 1 and 2, the stringed musical instrument string 1 according to the present invention is wound in a coil shape (spiral shape) at a normal time. Then, when used, the stringed musical instrument string 1 is unwound from the state of being wound in a coil shape, and is used by being straightened by a stringed musical instrument typified by a ukulele, a guitar, and the like.

In a state where the stringed musical instrument string 1 is wound in a coil shape at a normal time, the winding diameter D of the stringed musical instrument string 1 can be appropriately determined depending on the constituent material of the wire rod W forming the stringed musical instrument string 1, the outer diameter d of the stringed musical instrument string 1, the musical instrument to be applied, the scale of the string to be applied in the musical instrument, and the like. In general, the winding diameter D is preferably 0.8 to 4.0 mm, more preferably 1.0 to 3.0 mm, still more preferably 1.2 to 2.8 mm, and particularly preferably 1.3 to 2.7 mm. As illustrated in FIGS. 1 and 2, the "winding diameter D" refers to an outer diameter D (coil diameter) in a width direction of the coil-shaped stringed musical instrument string 1 surrounding the internal space 2 when wound in a coil shape.

The winding diameter D is preferably approximately within a range of values obtained by multiplying the outer diameter d of the stringed musical instrument string 1 (the wire rod W) by 8/3 to 10/3 (D=d×8/3 to dx 10/3). In addition, a length of one rotation (one rotation of the coil) in the width direction of the stringed musical instrument string 1 (an outer periphery in the width direction of the stringed musical instrument string 1 having a shape wound in a coil shape) is preferably approximately the winding diameter D×2.4 to 2.6. When the winding diameter D is within such a range, after the outer diameter d is determined, it is possible to estimate a coil length (length in the length direction (coil length direction: see FIG. 1.) of the stringed musical instrument string 1 manufactured with the winding diameter D and the unit length W (for example, 1 m) of the wire rod.

Similarly, the number of turns (the number of coils) t per unit length (1 m) of the stringed musical instrument string 1 can be appropriately determined depending on the constituent material of the wire rod W forming the stringed musical instrument string 1, the outer diameter d of the stringed musical instrument string 1, the musical instrument to be applied, the scale of the string to be applied in the musical instrument, and the like. However, in general, the number of turns (the number of coils) t per unit length is preferably 130 to 520 times/m, more preferably 150 to 420 times/m, still more preferably 170 to 400 times/m, and particularly preferably 190 to 380 times/m.

(II) Method for Manufacturing Stringed Musical Instrument String 1

An example of a method for manufacturing the stringed musical instrument string 1 of the present invention will be described. The stringed musical instrument string 1 illustrated in FIGS. 1 and 2 is wound in a coil shape (spiral shape) at a normal time, but in order to have such a shape wound in a coil shape, it is preferable to have a shape in which the straight (linear) wire rod W that is not wound is processed and wound in a coil shape (spiral shape).

As the wire rod W containing a synthetic resin, it is preferable to obtain the straight (linear) wire rod W which is not wound even at a normal time by using a conventionally known method such as extrusion molding, melt spinning, or dry (wet) spinning of the synthetic resin or the like exemplified in (I) described above. The wire rod W may have a single layer structure or a (multiple) layer structure such as a structure having a core portion and a sheath portion. The outer diameter d of the wire rod W can be within the range exemplified in (I) described above.

As the wire rod W containing such a synthetic resin, the wire rod W that is commercially available may be used, and among the resin materials described above, in the case of a polyvinylidene fluoride-based resin, for example, KF Strings, SEAGUAR (both manufactured by Kureha-Gohsen), ROOTS FC LEADER (manufactured by Gosen), X-BRAID (manufactured by YGK), Shooter (manufactured by Sunline), which are also known as fluorocarbon lines, and the like can be used. In addition, as the polyamide (nylon)-based resin, Ginrin (manufactured by Toray), Queen Star (manufactured by Sunline), A Prime (manufactured by Sanyo Nylon), and the like known as nylon threads and the like can be used.

Figure 3:
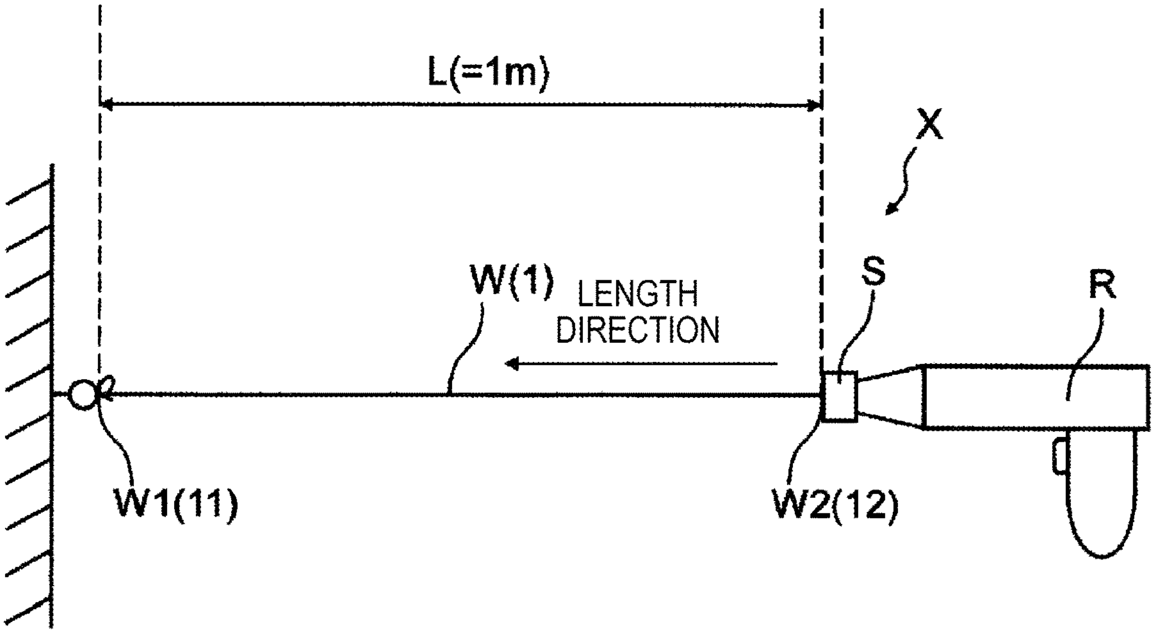
FIG. 3 is a view illustrating one aspect of a device for manufacturing a stringed musical instrument string.

Further, in order to process the unwound straight (linear) wire rod W in a coil shape (spiral shape), for example, the wire rod W can be easily manufactured by the following method using a device X illustrated in FIG. 3.

FIG. 3 is a view illustrating one aspect of the device X for manufacturing the stringed musical instrument string 1. FIG. 3 indicates the wire rod W (to be the stringed musical instrument string 1), a first end W1 of the wire rod W (to be the first end 11 of the stringed musical instrument string 1), a second end W2 of the wire rod W (to be the second end 12 of the stringed musical instrument string 1), a rotation drive body R, and a rotation drive unit S of the rotation drive body R. FIG. 3 illustrates an aspect in which a distance L between the first end W1 and the second end W2 of the wire rod W is 1 m.

The rotation drive body R is not particularly limited as long as the second end W2 of the wire rod W can be fixed, and the wire rod W can be twisted with respect to the length direction by being rotated with respect to the length direction of the wire rod W in FIG. 3, and examples thereof include a hand drill (manual hand drill, electric hand drill, and the like) in which the rotation drive unit S is rotatable. In addition, for example, in a state where the first end W1 of the wire rod W is fixed at a predetermined place, the second end W2 of the wire rod W may be chucked and fixed to (a chuck portion (not illustrated) of) the rotation drive unit S of the hand drill, and both ends W1 and W2 of the wire rod W may be fixed.

In FIG. 3, while the first end W1 of the wire rod W is fixed, the second end W2 is fixed to the rotation drive unit S that is rotatable with respect to the length direction of the wire rod W, and the wire rod W is stretched, the rotation drive unit S of the rotation drive body R is rotated with respect to the length direction, so that the second end W2 of the wire rod W is rotated with respect to the length direction (while applying predetermined tension as necessary), and (the second end W2 of) the wire rod W is twisted with respect to the length direction.

In FIG. 3, the second end W2 of the wire rod W is twisted by being twisted with respect to the length direction by the rotation of the rotation drive unit S, and as the twisting of the wire rod W progresses, the wire rod W is gradually wound in a coil shape (spiral shape) (hereinafter, the shape may be simply referred to as a "coil shape" or the like.) as illustrated in FIG. 1 and the like. "(a) The number of rotations at which the coil shape starts to be formed" described above (since the rotation is transmitted to (the second end W2 of) the wire rod W by the rotation drive unit S of the rotation drive body R for the twisting of the wire rod W, the number of rotations is the number of rotations (the number of twists) for the twisting of the wire rod W. The same applies hereinafter) is considered to be caused by the outer diameter d of the stringed musical instrument string 1, the length required for stretching the stringed musical instrument string 1 over the musical instrument to be applied, and the like, and can be appropriately determined according to the scale of the string to be applied in the musical instrument, and the like. In general, the number of rotations is preferably 400 rotations/m or more, more preferably 400 to 750 rotations/m, and particularly preferably 450 to 650 rotations/m per 1 m.

The wire rod W is wound in a coil shape by twisting, and as the twisting of the wire rod W further progresses, a limit (twist limit) is reached so that the wire rod W does not form a coil shape any more even if the wire rod W is twisted in a state where the required amount is formed into a coil shape. When the twist limit is reached, the wire rod W does not form a coil shape even if the wire rod W is further twisted, and the twisting is accumulated in the wire rod W even if the wire rod W is twisted. When the second end W2 of the wire rod W is removed from the rotation drive unit S and released, the energy accumulated by the rotation (twisting) is released or diverged, so that the wire rod W rotates in a direction opposite to a twisting (rotation) direction. When the wire rod W is once twisted with respect to the length direction to form a coil shape, even if the second end W2 of the wire rod W is removed from the rotation drive unit S and released, the wire rod W does not return to the original straight state, and the shape wound in a coil shape illustrated in FIGS. 1 and 2 is maintained.

"(b) The number of rotations at which the required amount is formed into a coil shape" is considered to be caused by the outer diameter d of the stringed musical instrument string 1, the length required for stretching the stringed musical instrument string 1 over the musical instrument to be applied, or the like, and can be appropriately determined according to the scale of a string to be applied in the musical instrument, or the like. However, it is considered to achieve the number of rotations by adding 200 to 500 rotations in addition to "(a) the number of rotations at which the coiled shape starts to be formed" described above, but is not particularly limited.

As a guide, "(a) the number of rotations at which the coil shape starts to be formed" and "(b) the number of rotations at which the required amount is formed into a coil shape" are combined, and the "number of rotations at which the wire rod W is wound in a coil shape" is preferably about 600 rotations/m or more, more preferably 700 rotations/m or more, and particularly preferably 750 rotations/m or more per 1 m. In consideration of cutting of the wire rod W, the number of rotations is preferably 1200 rotations/m or less, more preferably 1100 rotations/m or less, and particularly preferably 1050 rotations/m or less.

The number of rotations per 1 m described above is merely a guide, and is considered to be caused by the outer diameter d of the stringed musical instrument string 1, the length required for stretching the stringed musical instrument string 1 over the musical instrument to be applied, and the like. In addition, the number of rotations per 1 m may be appropriately determined according to the scale of the string to be applied in the musical instrument, and the like.

The rotation speed of the rotation drive unit S in the rotation drive body R (rotation speed for rotating the wire rod W) is preferably within a range of approximately 100 to 750 rpm since the manufacturing efficiency is improved when the rotation speed is high, and on the other hand, cutting of the wire rod W and the like may be caused when the rotation speed is excessively high.

In addition, the obtained wire rod W (the stringed musical instrument string 1) having a shape wound in a coil shape may be irradiated with a γ ray (gamma ray) as post-processing. As the wire rod W is irradiated with a γ ray, it is possible to change the produced timbre, sound quality, and the like (hereinafter, may be simply referred to as "timbre and the like"), and for example, it is possible to obtain various timbres and the like such as a unique timbre that is rounded and mellow as compared with a case where a γ ray is not irradiated. Such a change in the timbre and the like is presumed to be due to a state in which only the molecular arrangement of the wire rod W has changed with time for several tens of years due to irradiation with a γ ray.

The γ-ray irradiation condition can be appropriately determined according to the constituent material of the wire rod W for forming the stringed musical instrument string 1, the outer diameter d, the desired timbre, and the like, and is not particularly limited in a range in which various characteristics of the wire rod W (the stringed musical instrument string 1) are not adversely affected (for example, an excessive amount of irradiation deteriorates mechanical properties). For example, the absorbed dose can be set to 5000 to 20000 Gr around 10000 Gr as a guide, but is not limited to such a range. In addition, in order to realize the absorbed dose, for example, the dose rate is set to 100 to 10000 Gr/h, and the γ-ray irradiation may be performed by selecting an irradiation time suitable thereto, but the dose rate and the irradiation time may also be appropriately selected.

(III) Effect of Invention

The stringed musical instrument string 1 of the present invention described above has a configuration in which the wire rod W including a synthetic resin as a constituent material is wound in a coil shape at a normal time, and is stretched over a target stringed musical instrument in a state of being unwound from the coil shape when used. With such a configuration, the stringed musical instrument string 1 can reproduce an excellent timbre close to the timbre of a natural gut string at low cost by the wire rod W including a synthetic resin as a constituent material and has various characteristics (for example, no negative aspect even when the tension is weak, high volume, stable string even immediately after stretched, and accurate pitch) as the stringed musical instrument string 1.

In addition, the method for manufacturing the stringed musical instrument string 1 according to the present invention makes it possible to manufacture the stringed musical instrument string 1 having the above-described effect, which is wound in a coil shape at a normal time, by a simple method.

As described above, the obtained stringed musical instrument string 1 can be applied to various stringed musical instruments, but it is particularly preferable to apply the stringed musical instrument string 1 as a string to be applied to a ukulele or a guitar (a string for a ukulele, a string for a guitar).

(IV) Modifications of Embodiment

Note that the aspect described above illustrate one aspect of the present invention, and the present invention is not limited to the above-described embodiment, and it goes without saying that modifications and improvements having the configuration of the present invention and within a range in which an object and an effect can be achieved are included in the content of the present invention. In addition, the specific structure, shape, and the like in carrying out the present invention may be other structures, shapes, and the like as long as the object and effect of the present invention can be achieved. The present invention is not limited to the above-described embodiment, and modifications and improvements within the scope of achieving the object of the present invention are included in the present invention.

For example, in the above-described aspect, as illustrated in FIG. 3, an example in which the distance L between the first end W1 and the second end W2 of the wire rod W when the wire rod W is processed into the stringed musical instrument string 1 is set to 1 m has been described. However, the distance L is not particularly limited to 1 m, and the distance L may be selected from any distances that are easy to manufacture, for example, by being appropriately determined according to the length of the stringed musical instrument string 1 required for the musical instrument to which the stringed musical instrument string 1 is applied. The distance L gradually decreases as the straight wire rod W is wound in a coil shape in the actual process of manufacturing the stringed musical instrument string 1, and thus the second end W2 of the wire rod W also needs to be brought closer to the first end W1.

In the above aspect, as a means for twisting the second end W2 of the wire rod W with respect to the length direction of the wire rod W, the device X is exemplified, and it is described that the rotation drive unit S is rotated with respect to the length direction of the wire rod W in a state where the second end W2 of the wire rod W is fixed to the rotation drive unit S using the hand drill which is the rotation drive body R having the rotation drive unit S, and the wire rod W is twisted. However, the configuration, means, and the like of the device X are not limited to the above aspect, and any member or the like capable of twisting the wire rod W with respect to the length direction can be used.

In addition, the specific structure, shape, and the like in carrying out the present invention may be other structures and the like as long as the object of the present invention can be achieved.

EXAMPLES

Hereinafter, the present invention will be described in more detail based on examples and the like, but the present invention is not limited thereto.

Example 1

Manufacturing of String for Ukulele (1):

The following method is used to manufacture a string for a ukulele of Example 1, which is a stringed musical instrument string.

As the wire rod, fluorocarbon (fluorocarbon line) (KF Strings: Kureha-Gohsen. A polyvinylidene fluoride-based resin is used as a constituent material) having the outer diameter d of 0.47 mm (first string), 0.62 mm (second string), 0.74 mm (third string), and 0.52 mm (fourth string), whose specifications and the like are shown in Table 1, is prepared.

(Method for Manufacturing String for Ukulele)

As illustrated in FIG. 3, one end of the wire rod is fixed, the other end is fixed to a rotation drive unit of a commercially available hand drill (manual) as a rotation drive body (length from one end to the other end: 1 m), and the wire rod (the other end of the wire rod) is twisted with respect to the length direction by rotating the rotation drive unit of the hand drill under the conditions described in Table 1 while applying tension to the wire rod. As the rotation progresses, the wire rod form a shape wound in a coil shape, and when the wire rod reaches a state of no more being twisted (twist limit), the rotation is stopped, and the wire rod is removed from the hand drill to obtain a string for a ukulele of Example 1 whose appearance is as illustrated in FIGS. 1 and 2. The winding diameter D, the number of turns t, and the like of the obtained string for a ukulele of Example 1 are also shown in Table 1 as specifications and the like of Example 1. In Table 1, the polyvinylidene fluoride-based resin is simply referred to as "polyvinylidene fluoride". In addition, in Table 1, "the coil length (mm)" in "the coil length manufactured with 1 m of the wire rod (mm)" indicates the length (mm) in the length direction (coil length direction: see FIG. 1) of the stringed musical instrument string (string for a ukulele) (hereinafter, the same applies to Example 2 (Table 2)).

(Specifications, Etc. Of Example 1)

TABLE 1

| | FIRST STRING | SECOND STRING | THIRD STRING | FOURTH STRING |
|---|---|---|---|---|
| OPEN SCALE (CORRESPONDING FREQUENCY (Hz) IN LOWER COLUMN) | A<br>440 | E<br>329.6 | C<br>261.6 | G<br>392 |
| NUMBER (CONVERTED INTO FISHING LINE) | 8 | 14 | 20 | 10 |
| OUTER DIAMETER d OF WIRE ROD (mm) | 0.47 | 0.62 | 0.74 | 0.52 |
| WINDING DIAMETER D (mm) | 1.45 | 2 | 2.2 | 1.6 |
| COIL LENGTH MANUFACTURED WITH 1 m OF WIRE ROD (mm) | 170 | 170 | 170 | 170 |
| NUMBER OF TURNS t (NUMBER OF COILS) (TIMES/m) | 360 | 270 | 230 | 325 |
| CONSTITUENT MATERIAL OF WIRE ROD | POLYVINYLIDENE FLUORIDE (FLUOROCARBON) | | | |

(a) The number of rotations at which the coil shape starts to be formed is 500 to 600 times/m of twisting (rotation) for all the four wire rods in Table 1 to start to change into a coil shape. Further, (b) the number of rotations at which the required amount (1 m in this case) is formed into a coil shape is 300 to 400 rotations/m (in total with the number of rotations, the number of rotations for forming a 1 m wire rod into a coil shape is 800 to 1000 rotations/m) for all the four wire rods in Table 1 in addition to the number of rotations (although the number of rotations changes depending on the tension). The number of rotations of the rotation drive unit of the hand drill is appropriately changed within a range of 100 to 750 rpm.

Two types of strings for a ukulele in Example 1 shown in Table 1 are manufactured, one irradiated with a γ ray and another not irradiated with a γ ray under the following irradiation conditions. Irradiation with a γ ray (cobalt 60) is performed using a device having a radiation source intensity of 2000 TBq in a cobalt 60 irradiation facility. The test is performed on each of the four strings for a ukulele. There is almost no change in the appearance of the irradiated strings for a ukulele of Example 1.

(γ-Ray Irradiation Conditions)

Source intensity: 2000 TBq

Dose rate: about 5000 Gy/h

Irradiation time: 2 hours (in total, cobalt 60 with an absorbed dose of about 10000 Gy is irradiated)

Test Example 1

Evaluation of Strings for Ukulele:

The obtained strings for a ukulele of Example 1 are evaluated including comparison with the following general commercially available strings for a ukulele (nylon string and (fluoro) carbon string (hereinafter, may be simply referred to as a "carbon string")) as a reference example. When used, the strings for a ukulele of Example 1 are unwound from a shape wound in a coil shape and stretched over a ukulele.

Specifically, two evaluators (panelists) who (one of them is an active professional musician) have experience of being a professional musician test the following evaluation items ((1) to (5)) by stretching a nylon string and a carbon string, which are representative examples of the strings for Example 1 and a general ukulele, over a ukulele of the same model and playing the ukulele, or by stringing a plurality of ukuleles owned by the evaluators with the strings for a ukulele of Example 1 and playing the ukuleles, and then comparing the strings for a ukulele with general strings for a ukulele including the above-described strings for a ukulele, so that the evaluators evaluate the strings for a ukulele of Example 1 including the comparison with the general strings for a ukulele.

(Reference Example: Nylon String)

Product name: Famous Ukulele Nylon String (First string (A), —second string (E), —third string (C), —fourth string (G) (Open scale in the parentheses. Hereinafter, the same applies to the carbon string.): 0.64-0.81-0.91-0.71)

(Reference Example: Carbon String)

Product name: Worth Clear Fluoro Medium (First string (A) —second string (E) —third string (C) —fourth string (G): 0.52-0.67-0.74-0.57)

(Evaluation Items and Results)

(1) Relationship with Tension (Strength of Tension of String for Ukulele):

According to the evaluators, in the case of tuning to the same sound (scale), the strings for a ukulele of Example 1 feel that the tension is weaker than that of the general strings for a ukulele, but feel that there is no negative aspect that is, in general, generated in the strings with weak tension when the same sound is output. Here, "there is no negative aspect" means, for example, that the following does not occur: the tension becomes weak and it is difficult to apply the intensity of the volume when plucking the string for a ukulele, or finger separation from the string for a ukulele becomes worse so that the player has to pay close attention (that is, it becomes difficult to pluck the string).

(2) Volume (Volume when Plucking String):

According to the evaluators, the volume generated when the strings for a ukulele of Example 1 are plucked feels high for strings having low tension as described in (1). In addition, when the strings for a ukulele of Example 1 are compared with the general strings for a ukulele, in the case of a standard tension, the volume feels such that the nylon string<Example 1<the carbon string (in terms of the volume, the nylon string is the quietest and the carbon string is the loudest).

(3) Period to String Stabilization (Period from Stringing to Tuning Stabilization):

As a period until a string is stabilized, it takes about one month for a general nylon string and about two weeks for a general carbon string. However, in Example 1, according to the evaluators, the strings do not feel unstable even after being stretched over a ukulele. Specifically, since the decrease in pitch due to the extension of the strings are moderate even immediately after the strings are stretched over a ukulele, according to the evaluators, the strings for a ukulele of Example 1 may be able to be stably used even in a short time of several hours to several days after the strings are stretched.

(4) Pitch Accuracy (Whether Correct Scale can be Produced):

According to the evaluators, the pitch is accurate when the strings for a ukulele of Example 1 are evaluated alone, and there is no significant difference even when compared with general strings for a ukulele (unlike inexpensive ukulele strings with difficulty in pitch, the strings here refer to expensive ukulele strings with excellent pitch accuracy).

(5) Timbre:

A general nylon string is said to produce a warm, rounded, somewhat wet timbre (a warm and rounded timbre which having a generally long-held image of a ukulele timbre), while a general carbon string is said to produce a strong and clear timbre (also a general ukulele timbre, but clearer, stronger and more robust in contour, while "warm" and "mellow" feelings are weaker compared to a nylon string). According to the evaluators, the strings for a ukulele of Example 1 have an impression of a bright, light, and fresh timbre, and for example, reproduce a timbre close to the timbre of a natural gut string.

The timbre of a natural gut string is a timbre located between nylon and carbon, and is said to be a timbre that is stronger than a nylon string and warmer than a carbon string, and is light and dry in a good sense. In addition, it is also said that due to the "roughness" of the surface of the string, which is structurally generated, moderate (comfortable) finger noise is generated when the string is used as a string of a stringed musical instrument, and when a finger holding a fret is moved while playing solo, a pleasant squeaking sound is produced, and a "feeling of playing" is generated.

Although the above description is a feature of a natural gut, there is an impression that the strings for a ukulele of Example 1 follow such a feature, and an impression of not only a simple sound such as a single sound, but also the feeling when playing the ukulele is very close to that of a natural gut. However, the greatest drawback of a natural gut, which is that a natural gut breaks immediately when strongly plucked, is solved, and the strings for a ukulele of Example 1 do not break even when strongly plucked.

(6) Other Comments:

According to the evaluators, the strings for a ukulele of Example 1 have a remarkable improvement effect on the problems in the case of using a natural gut string or a vintage string and the problems of the sound including the timbre in the case of using an inexpensive and peculiar ukulele (severe compatibility with a string, a strong peculiarity (tendency) of a musical instrument main body, and a tendency of a string height to be high, resulting in having a tendency of a pitch deviation in a high position to be noticeable).

In general, a natural gut string is much inferior in stability and durability to a nylon string or a carbon string, and is very expensive. Therefore, at present, there are few people who use a natural gut string as a string for a ukulele. A natural gut string has been used in some cases when ukuleles have started to be produced, but currently, a natural gut string is rarely used for a musical instrument other than a classical musical instrument (also a very expensive musical instrument), and particularly, is rarely used for a ukulele.

On the other hand, what is brilliant about the timbre of the strings for a ukulele of Example 1 is that the timbre is as beautiful as that of a general string such as a nylon string or a carbon string even when compared, the timbre is excellent, and the produced sound is stable, so that many people would enjoy the timbre as a timbre very close to that of a natural gut. results (impressions) are the same. In addition, it has been confirmed that the string for a ukulele irradiated with a γ ray has a unique timbre that is rounded and mellow. This is presumed to be because only the molecular arrangement of the wire rod (polyvinylidene fluoride-based resin (fluorocarbon)) has changed with time for several tens of years.

Example 2

Manufacturing of String for Ukulele (2):

As the wire rod, nylon wires (nylon thread) (Ginrin: Toray using a polyamide (nylon)-based resin as a constituent material) having the outer diameter d of 0.62 mm (first string), 0.81 mm (second string), 0.87 mm (third string), and 0.7 mm (fourth string), whose specifications and the like are shown in Table 2, are prepared.

Then, the above-described wire rod is used in the same manner as in the "method for manufacturing a string for a ukulele" of Example 1 to manufacture a string for a ukulele of Example 2 which is a stringed musical instrument string. The winding diameter D, the number of turns t, and the like of the obtained string for a ukulele of Example 2 are also shown in Table 2 as specifications and the like of Example 2. In Table 2, the polyamide-based resin is simply referred to as "polyamide".

(Specifications, Etc. Of Example 2)

TABLE 2

| | FIRST STRING | SECOND STRING | THIRD STRING | FOURTH STRING |
|---|---|---|---|---|
| OPEN SCALE (CORRESPONDING FREQUENCY (Hz) IN LOWER COLUMN) | A<br>440 | E<br>329.6 | C<br>261.6 | G<br>392 |
| NUMBER (CONVERTED INTO FISHING LINE) | 14 | 24 | 28 | 18 |
| OUTER DIAMETER d OF WIRE ROD (mm) | 0.62 | 0.81 | 0.87 | 0.7 |
| WINDING DIAMETER D (mm) | 1.88 | 2.45 | 2.6 | 2.11 |
| COIL LENGTH MANUFACTURED WITH 1 m OF WIRE ROD (mm) | 170 | 170 | 170 | 170 |
| NUMBER OF TURNS t (NUMBER OF COILS) (TIMES/m) | 270 | 210 | 200 | 240 |
| CONSTITUENT MATERIAL OF WIRE ROD | POLYAMIDE (NYLON) | | | |

In addition, as a guide of a period in which the string can be used, a general nylon string is considered to be one year, and a carbon string is considered to be three years. However, in consideration of the use feeling and the like this time, according to the evaluators, it is expected that there is no deterioration in sound even in long-term use exceeding the used period of a general string for a ukulele or the like, and it is expected that durability is also good.

In consideration of the above results, it has been confirmed that the strings for a ukulele of Example 1 can reproduce an excellent timbre close to the timbre of a natural gut string, is comparable to a general nylon string or carbon string, and has various characteristics as strings for a ukulele, such as no negative aspect even when the tension is weak, high volume, stable string even immediately after stretched, and accurate pitch.

In addition, the strings for a ukulele of Example 1 that suitably exert the above effect can be manufactured easily and at low cost by using a relatively inexpensive wire rod containing fluorocarbon (polyvinylidene fluoride-based resin) used for a fishing line and using the above method.

The evaluation is performed using two types of the strings for a ukulele of Example 1, one irradiated with a γ ray and another not irradiated with a γ ray, but the basic evaluation As in Example 1, (a) the number of rotations at which the coil shape starts to be formed is 500 to 600 times/m of twisting for all the four wire rods in Table 2 to start to change into a coil shape. In addition, similarly to Example 1, (b) the number of rotations at which the required amount (1 m in this case) is formed into a coil shape is 300 to 400 rotations/m (in total with the number of rotations, the number of rotations for forming a 1 m wire rod into a coil shape is 800 to 1000 rotations/m) for all the four wire rods in Table 2 in addition to the number of rotations (although the number of rotations changes depending on the tension). Similarly to Example 1, the number of rotations of the rotation drive unit of the hand drill is appropriately changed within a range of 100 to 750 rpm.

The string for a ukulele of Example 2 shown in Table 2 is irradiated with a γ ray under the same conditions as the γ ray irradiation conditions shown in Example 1. As a result, similarly to Example 1, it is confirmed that the string for a ukulele irradiated with a γ ray has a unique timbre that is rounded and mellow as compared with the timbre of the string not irradiated with a γ ray. This is also presumed to be because only the molecular arrangement of the wire rod (polyamide (nylon)-based resin) has changed with time for several tens of years.

INDUSTRIAL APPLICABILITY

The present invention is highly industrially applicable as a means for providing a stringed musical instrument string capable of reproducing a timbre similar to a timbre of a natural gut string at low cost.

REFERENCE SIGNS LIST

1 stringed musical instrument string
11 first end
12 second end
2 internal space
W wire rod
W1 first end of wire rod
W2 second end of wire rod
R rotation drive body
S rotation drive unit
L distance between first end and second end of wire rod
X device
D winding diameter
d outer diameter of stringed musical instrument string

The invention claimed is:

1. A stringed musical instrument string comprising:
a wire rod containing a synthetic resin and having an outer diameter d of 0.3 to 1.2 mm, wherein
the stringed musical instrument string has a shape wound in a coil shape and having an internal space, and
the stringed musical instrument string is used in a state in which it is unwound from a coiled state.

2. The stringed musical instrument string according to claim 1, wherein
the synthetic resin is at least one selected from a group consisting of a polyvinylidene fluoride-based resin and a polyamide-based resin.

3. The stringed musical instrument string according to claim 1, wherein
the shape wound in the coil shape has a winding diameter D of 0.8 to 4.0 mm, and
a number of turns (number of coils) t per 1 m is 130 to 520 times/m.

4. The stringed musical instrument string according to claim 1, wherein
the stringed musical instrument string is a string for a ukulele or a string for a guitar.

5. A method for manufacturing a stringed musical instrument string according to claim 1, comprising:
fixing one end of a wire rod containing a synthetic resin and having an outer diameter d of 0.3 to 1.2 mm, and twisting another end of the wire rod with respect to a length direction to form a shape of the wire rod wound in a coil shape.

6. The method for manufacturing a stringed musical instrument string according to claim 5, wherein
the synthetic resin is at least one selected from a group consisting of a polyvinylidene fluoride-based resin and a polyamide-based resin.

7. The method for manufacturing a stringed musical instrument string according to claim 5, wherein
the wire rod is formed into the shape wound in the coil shape at a number of rotations of 600 rotations/m or more.

8. The method for manufacturing a stringed musical instrument string according to claim 5, wherein
the wire rod having the shape wound in the coil shape is irradiated with a $\gamma$ ray.

* * * * *